US011267732B2

(12) United States Patent
Boudreaux et al.

(10) Patent No.: US 11,267,732 B2
(45) Date of Patent: Mar. 8, 2022

(54) METHODS AND SYSTEMS FOR REMOVING NITRATES IN ZERO LIQUID DISCHARGE APPLICATIONS (71) Applicant: CHEMTREAT, INC., Glen Allen, VA (US)

(72) Inventors: Kevin Boudreaux, Sioux Falls, SD (US); Douglas McIlwaine, Ashland, VA (US); Rajendra Prasad Kalakodimi, Glen Allen, VA (US)

(73) Assignee: CHEMTREAT, INC., Glen Allen, VA (US)

( * ) Notice: Subject to any disclaimer, the term of this patent is extended or adjusted under 35 U.S.C. 154(b) by 0 days.

(21) Appl. No.: 16/766,892

(22) PCT Filed: Nov. 27, 2018

(86) PCT No.: PCT/US2018/062588
§ 371 (c)(1),
(2) Date: May 26, 2020

(87) PCT Pub. No.: WO2019/104314
PCT Pub. Date: May 31, 2019

(65) Prior Publication Data
US 2020/0299166 A1 Sep. 24, 2020

Related U.S. Application Data
(60) Provisional application No. 62/590,960, filed on Nov. 27, 2017.

(51) Int. Cl.
C02F 1/70 (2006.01)
C02F 9/00 (2006.01)
(Continued)

(52) U.S. Cl.
CPC .............. *C02F 1/70* (2013.01); *B01D 9/0059* (2013.01); *B01D 53/565* (2013.01); *C02F 9/00* (2013.01);
(Continued)

(58) Field of Classification Search
CPC .......... C02F 9/00; C02F 1/705; C02F 11/122; C02F 11/127; C02F 2001/5218;
(Continued)

(56) References Cited

U.S. PATENT DOCUMENTS 4,668,377 A * 5/1987 Chen ...................... C10G 45/64
208/111.15
5,507,956 A * 4/1996 Bonse ...................... B01J 23/40
210/757
(Continued)

FOREIGN PATENT DOCUMENTS

WO 2014/088826 6/2014

OTHER PUBLICATIONS

Ferro, S. Removal of Nitrates from Highly-Contaminated Industrial Wastewater. La Chimica & L'Industria. Mar. 2012; p. 102-103.
(Continued)

Primary Examiner — Joseph W Drodge
(74) Attorney, Agent, or Firm — Oliff PLC (57) ABSTRACT Disclosed herein are a method for treating a water stream in a zero liquid discharge (ZLD) system and a ZLD system. The method includes contacting the water stream with a metal agent that reduces a nitrate contained therein to a nitrite, and introducing an amide into the water stream that reduces the nitrite to nitrogen to provide a treated water stream having a reduced nitrate concentration. The ZLD system includes a mix tank, an amide tank including an amide, and a crystallizer. The mix tank includes an inlet for receiving a water stream within the mix tank, and a container
(Continued)

including a metal agent. The container is designed to allow the water stream to contact the metal agent. The amide tank is designed to direct the amide into the water stream, and the crystallizer is designed to receive the water stream from the mix tank.

20 Claims, 5 Drawing Sheets

(51) Int. Cl.
*C02F 11/12* (2019.01)
*B01D 9/00* (2006.01)
*B01D 53/56* (2006.01)
*C02F 11/122* (2019.01)
*C02F 11/127* (2019.01)
*C02F 1/52* (2006.01)
*C02F 101/16* (2006.01)
*C02F 103/02* (2006.01)
*C02F 103/34* (2006.01)

(52) U.S. Cl.
CPC ............. *C02F 1/705* (2013.01); *C02F 11/122* (2013.01); *C02F 11/127* (2013.01); *C02F 2001/5218* (2013.01); *C02F 2101/163* (2013.01); *C02F 2103/023* (2013.01); *C02F 2103/34* (2013.01)

(58) Field of Classification Search
CPC .......... C02F 2101/163; C02F 2103/023; C02F 2103/34; C02F 1/70; C02F 1/22; C02F 1/685; C02F 1/686; C02F 11/12; C02F 11/121; B01D 9/00; B01D 9/0059; B01D 9/02; B01D 53/56; B01D 53/565
See application file for complete search history.

(56) References Cited

U.S. PATENT DOCUMENTS

| | | | |
|---|---|---|---|
| 5,622,647 A * | 4/1997 | Kerr ...................... | B01D 21/01 252/194 |
| 6,030,520 A * | 2/2000 | Dziewinski ............ | B01D 53/54 205/771 |
| 6,436,275 B1 | 8/2002 | Dziewinski et al. | |
| 7,892,439 B2 * | 2/2011 | Hadjiev .................. | C02F 1/705 210/748.1 |
| 2006/0196836 A1 * | 9/2006 | Arakel ................. | B01D 61/025 210/723 |
| 2007/0125719 A1 * | 6/2007 | Yarbrough ............. | F22D 11/00 210/748.15 |
| 2007/0256985 A1 * | 11/2007 | Zhao ....................... | B09C 1/002 210/757 |
| 2010/0163471 A1 * | 7/2010 | Elyanow .................. | C02F 9/00 210/176 |
| 2011/0114567 A1 * | 5/2011 | Xia ..................... | B01D 21/0042 210/714 |
| 2012/0160753 A1 * | 6/2012 | Vora .......................... | C02F 9/00 210/175 |
| 2014/0326674 A1 | 11/2014 | Richardson | |
| 2016/0289092 A1 * | 10/2016 | Kratochvil ............. | C02F 1/442 |
| 2016/0368783 A1 * | 12/2016 | Ertel .................... | B01D 9/0031 |
| 2017/0210639 A1 * | 7/2017 | Monzyk ................... | C02F 1/66 |

OTHER PUBLICATIONS

International Searching Authority, Notification of Transmittal of the International Search Report and the Written Opinion of the International Searching Authority, or the Declaration, dated Jan. 16, 2019, pp. 9.

* cited by examiner

TANK TOP VIEW
FIG. 4

METHODS AND SYSTEMS FOR REMOVING NITRATES IN ZERO LIQUID DISCHARGE APPLICATIONS

This application claims the benefit of U.S. Provisional application Ser. No. 62/590,960, filed Nov. 27, 2017. The disclosure of the prior application is hereby incorporated by reference herein in its entirety.

BACKGROUND

Increasingly stringent discharge regulations, company mandated green initiatives, public perception of industrial impact on the environment, and/or concern over the quality and quantity of the water supply are compelling utilities and industrial plants to operate as a Zero Liquid Discharge (ZLD) system. For example, highly saturated brine wastewaters, such as cooling tower blowdown, which had previously been dumped into rivers, may be processed via a ZLD system for reuse. ZLD systems and processes are those that have the goal of completely eliminating liquid discharge from the system. The goals of ZLD systems is to dramatically reduce, if not completely eliminate, the volume of wastewater that requires treatment, process this wastewater in an economically feasible manner, produce a clean stream suitable for reuse elsewhere in the facility, and produce solid waste that does not present any particular disposal concerns.

The water stream makeup source to be processed in a ZLD system may be, for example, surface waters, such as lakes and rivers, or municipal gray waters. These gray waters, which are wastewater streams from households and offices, tend to contain a large amount of one or all the following: ammonia, phosphate, total organic carbon, and nitrate. As show in Table 1 below, a municipal gray water may have, for example, 270 times the nitrate concentrations as compared to a nearby lake, well, or river water source,

TABLE I

| Parameter | Express As | UOM | City Water | Gray Water | Circ. Water |
|---|---|---|---|---|---|
| pH | | | 7.82 | 7.34 | 6.58 |
| Conductivity | | μmho | 214 | 1123 | 4005 |

TABLE I-continued

| Parameter | Express As | UOM | City Water | Gray Water | Circ. Water |
|---|---|---|---|---|---|
| P-Alkalinity | CaCO3 | mg/L | — | — | — |
| M-Alkalinity | CaCO3 | mg/L | 74 | 113 | 27 |
| Calcium | CaCO3 | mg/L | 67 | 268 | 979 |
| Magnesium | CaCO3 | mg/L | 12 | 20 | 99 |
| Iron | Fe | mg/L | <0.01 | 0.06 | 1.9 |
| Copper | Cu | mg/L | 0.05 | <0.01 | 0.03 |
| Zinc | Zn | mg/L | <0.01 | 0.04 | 0.15 |
| Sodium | Na | mg/L | 6.5 | 88 | 409 |
| Potassium | K | mg/L | 4.4 | 55 | 192 |
| Chloride | Cl | mg/L | 20 | 134 | 570 |
| Sulfate | SO4 | mg/L | 26 | 253 | 1406 |
| Nitrate | NO3 | mg/L | <0.10 | 27 | 64 |
| Silica | SiO2 | mg/L | 10 | 13 | 66 |
| Phosphonate | PO4 | mg/L | <0.10 | <0.10 | 2.5 |
| Aluminum | Al | mg/L | <0.05 | <0.05 | 0.09 |
| Boron | B | mg/L | <0.05 | 0.22 | 0.8 |
| Barium | Ba | mg/L | 0.01 | 0.04 | 0.15 |
| Strontium | Sr | mg/L | 0.15 | 0.93 | 3.5 |
| Total Phosphate | PO4 | mg/L | <0.10 | 0.6 | 6.2 |
| Ortho-Phosphate | PO4 | mg/L | <0.10 | 0.1 | 3.7 |

Figure 1A:
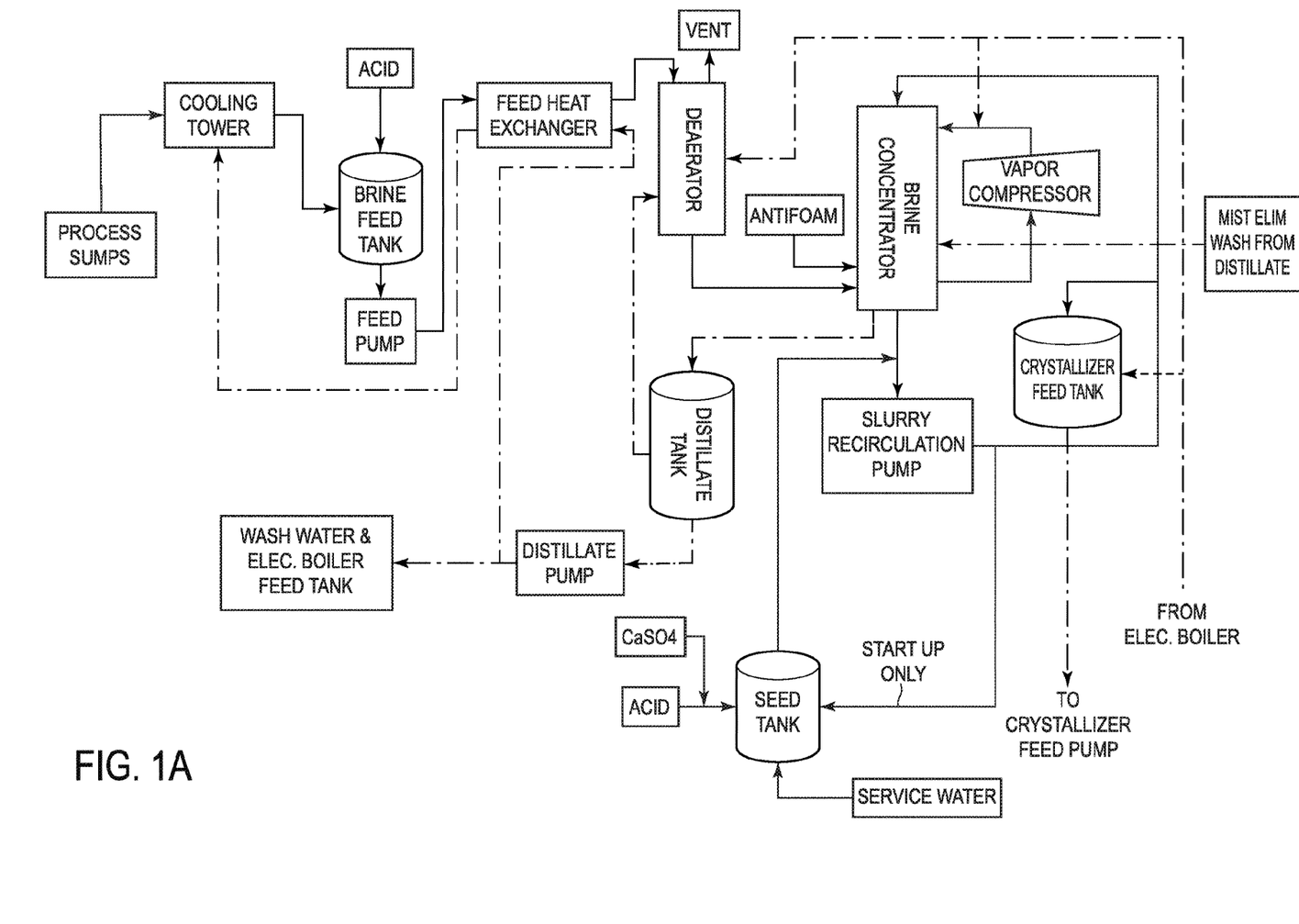
FIGS. 1A and 1B are schematic diagrams of a ZLD system.
Figure 1B:
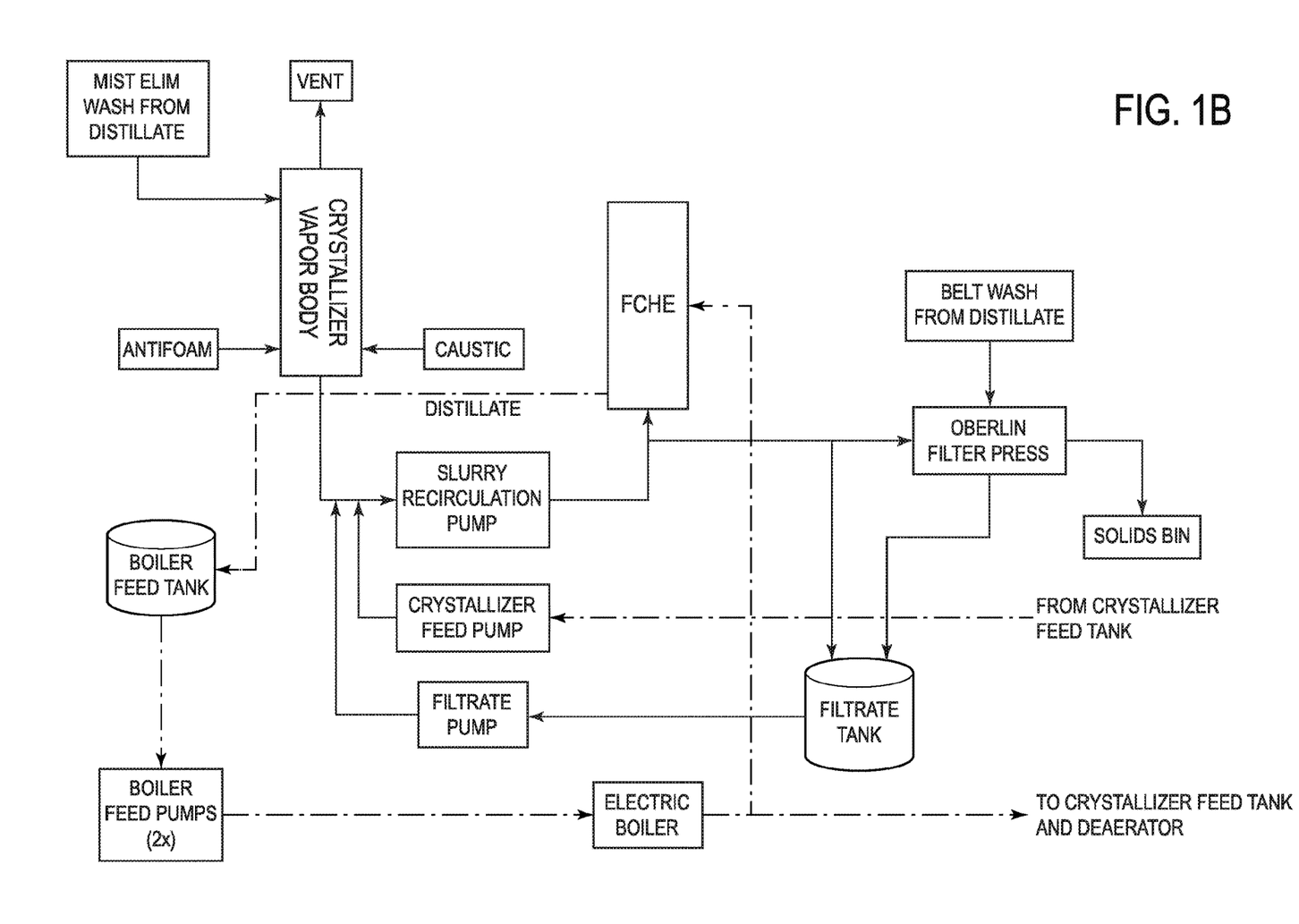

ZLD systems can use thermal evaporation technology to crystallize and remove compounds, such as sulfates and hydroxides from the water stream. ZLD systems can include a brine concentrator, a crystallizer, and a final concentrator apparatus, such as a centrifuge or filter press to separate solids from water. A ZLD system is shown schematically in FIGS. 1A and 1B, in which a brine concentrator, crystallizer, and a filter press, are used to remove solids from wastewater streams by using the principles of evaporation and crystallization.

SUMMARY

While very effective at removing sparingly soluble compounds, such as calcium carbonate, calcium sulfate, and magnesium hydroxide, through the process of crystallization, ZLD systems are not effective at removing very soluble compounds, particularly nitrates.

Some of the most common compounds experienced in ZLD operations are shown in Table 2 below in order from most soluble to least soluble. Table 2 shows solubilities of these compounds at different temperatures.

TABLE 2

| Substance | formula | 0° C. | 10° C. | 15° C. | 20° C. | 30 ° C. | 40° C. |
|---|---|---|---|---|---|---|---|
| Ammonium nitrate | NH4NO3 | 118 | 150 | | 192 | 242 | 297 |
| Calcium nitrate tetrahydrate | Ca(NO3)2.4H2O | 102 | 115 | 129 | 152 | 191 | |
| Potassium nitrate | KNO3 | 13 | 22 | 33 | 48 | 65 | 84 |
| Sodium nitrate | NaNO3 | 73 | 80.8 | 87.6 | 94.9 | 102 | |
| Calcium chloride | CaCl2 | 59.5 | 64.7 | 74.5 | 100 | 128 | |
| Strontium nitrate | Sr(NO3)2 | 39.5 | 54.9 | 70.8 | 87.6 | 91.3 | 92.6 |
| Magnesum nitrate | Mg(MO3)2 | 62.1 | 66 | 69.5 | 73.6 | 78.9 | |
| Magnesium chloride | MgCl2 | 52.9 | 53.6 | 54.6 | 55.8 | 57.5 | |
| Magnesium sulfate | MgSO4 | 25.5 | 30.4 | 35.1 | 39.7 | 44.7 | 50.4 |
| Sodom chloride | NaCl | 35.65 | 35.72 | 36 | 36.09 | 36.37 | 36.69 |
| Barium nitrate | Ba(NO3)2 | 4.95 | 6.77 | 9.02 | 11.5 | 14.1 | |
| Calcium sulfate | CaSO4.2H2O | 0.223 | 0.244 | 0.255 | 0.264 | 0.265 | |
| Calcium hydroxide | Ca(OH)2 | 0.189 | 0.182 | 0.173 | 0.16 | 0.141 | |
| Strontium sulfate | SrSO4 | 0.0113 | 0.0129 | 0.0132 | 0.0138 | 0.0141 | |
| Magnesium hydroxide | Mg(OH)2 | | | $9.628 \times 10^{-4}$ | | | |
| Barium sulfate | BaSO4 | | | $2.448 \times 10^{-4}$ | $2.85 \times 10^{-4}$ | | |

TABLE 2-continued

| Substance | 50° C. | 60° C. | 70° C. | 80° C. | 90° C. | 100° C. |
|---|---|---|---|---|---|---|
| Ammonium nitrate | 344 | 421 | 499 | 580 | 740 | 871 |
| Calcium nitrate tetrahydrate | | | 358 | | 363 | |
| Potassium nitrate | 106 | 132 | 167 | 199.5 | 240 | |
| Sodium nitrate | 122 | | 148 | | 180 | |
| Calcium chloride | 137 | | 147 | 154 | 159 | |
| Strontium nitrate | 94 | 97.2 | 99 | 101.1 | | |
| Magnesum nitrate | 78.9 | | 91.6 | 106 | | |
| Magnesium chloride | 61 | | 66.1 | 69.5 | 73.3 | |
| Magnesium sulfate | 54.8 | 59.2 | 54.8 | 52.9 | 50.2 | |
| Sodom chloride | 37.04 | 37.46 | 37.93 | 38.47 | 38.99 | |
| Barium nitrate | 20.4 | | 27.2 | | 34.4 | |
| Calcium sulfate | 0.244 | | 0.234 | | 0.205 | |
| Calcium hydroxide | 0.121 | | 0.086 | 0.076 | | |
| Strontium sulfate | 0.0131 | | 0.0116 | 0.0115 | | |
| Magnesium hydroxide | | | | | 0.004 | |
| Barium sulfate | | | | | | |

As shown in Table 2, compounds, such as sulfates and hydroxides in the final concentration apparatus, are easily removed due to their low solubility, whereas nitrates remain soluble even as the temperature increases. Not only are nitrate compounds very soluble, they become even more soluble at elevated temperatures, such as those in a brine concentrator or crystallizer, for example, which operate at temperatures in the range of from 215 to 220° F. and 225 to 235° F., respectively. For instance, each of calcium nitrate, lithium nitrate, sodium nitrate, ammonium nitrate, and strontium nitrate more than doubles in solubility at a temperature in a range of from 25° to 150° C. Solubility of barium nitrate increases by a factor of 7, while solubility of potassium nitrate increases nearly ten times (37.3 to 493 g/100 g $H_2O$) with the increase in temperature. Additionally, with an increase in temperature, nitrogen preferably bonds with calcium and magnesium. Given the amount of calcium and magnesium present in these operations, the formation of a large amount of very soluble nitrate molecules occurs.

Nitrate solubility, and more specifically the difficulty in removing nitrates from wastewaters via crystallization, is a problem in ZLD systems and processes. Nitrates in the water stream can be concentrated up to levels which inhibit the crystallization process in the ZLD process. Because nitrates are not removed with the solids in the final concentrator apparatus, they are recycled back to the crystallizer with the filtrate. Because of the cyclical nature of these systems, the nitrate compounds continue to accumulate. No matter how many times the filtrate is sent back through the process, the nitrate compounds are not removed, and thus continue to concentrate. The accumulation of nitrates increases the boiling point elevation of the crystallizer, which in turn increases the heat input demand. However, plants operating thermal systems do not have an infinite supply of heat, which is typically in the form of steam or vapor compressor capacity, nor could the crystallizer handle an infinite amount of heat input. At some point, e.g., at boiling points of about 230° F. or 240° F., the amount of heat necessary to induce evaporation exceeds the amount of heat available or the design limitations of the system. It is at this point that the plant must either shut down or dispose of the slurry, both of which are very expensive.

For example, nitrates in an amount of greater than 250,000 ppm are not uncommon in ZLD systems. Prior to entering the ZLD process, the makeup water source may be used, for example, in a cooling tower application, where the ions in the makeup source are concentrated up to 10 to 20 times. The cooling tower blowdown can be sent to a reverse osmosis unit prior to the ZLD process, which will further concentrate the stream 3 to 4 times before being processed in the ZLD system. This results in a total concentration factor of nearly 40 times the original concentrations of the makeup water. Once in the ZLD process, the waste stream is processed via a brine concentrator, which will concentrate the water stream up 20 to 50 times. After the brine concentrator, the water is concentrated up to 2 to 3 times in a crystallizer. The end result for a typical ZLD process is a concentration of the makeup source ions of 400 times after being processed in the crystallizer. A final concentrator apparatus, such as a filter press or centrifuge, then produces a final concentration of 85-98% total solids and 5-15% moisture.

Therefore, when a gray water source having a nitrate concentration of, for example, greater than 10 ppm, greater than 20 ppm, from about 10 to about 300 ppm, or about 30 ppm, is used as the plant makeup water source, the nitrate concentration may be greater than 4,000, greater than 8,000, from about 4,000 to about 120,000 ppm, or about 12,000 by the time the water is processed in the crystallizer (for the first time) and is being sent to the final concentrator using the above concentration factor of 400 times. For example, The nitrate concentration will continue to increase as the filtrate from the final concentrator apparatus is repeatedly sent back to the crystallizer. As discussed above, such nitrate concentrations will affect the performance of the crystallizer. For example, crystallizer performance may begin to be affected at a nitrogen concentration of about 3,000 ppm or more.

As such, there is a need for a process to remove nitrates from water streams in ZLD systems. However, many technologies for removing nitrates from waste streams have serious disadvantages in ZLD processes. For example, biological reactors have been used for the removal of nitrates, with some being designed for hypersaline solutions. However, the bacteria would not be able to survive under the conditions of a ZLD system. Additionally, biological reactors are very costly, and require a lot of maintenance to maintain both the equipment and the bacteria population.

Reverse osmosis systems have also been used to remove some nitrates, but there is always an associated reject stream with these systems. Additionally, even though the waste stream volume is decreased, the concentration of nitrates is typically increased by a factor of about 4, which requires further processing.

Demineralizer systems have also been used for the removal of nitrates. Demineralizer systems, however, are not specific to nitrates and would exhaust prematurely in ZLD processes due to the high ionic loading present in ZLD waste streams. There has been research performed with a nitrate specific resin, which reduces the total ionic loading. However, even with the reduction in total ionic loading, the large concentrations of nitrates in ZLD processes would make the system cost prohibitive. Furthermore, demineralizer operations require expensive resin, frequent regenerations, and the waste from those regenerations must be still be processed.

In one aspect, this disclosure provides methods and systems for removing nitrates from water streams in industrial and utility ZLD applications.

Disclosed herein are a method for treating a water stream in a ZLD system, and a ZLD system. The method includes contacting the water stream with a metal agent that reduces a nitrate contained therein to a nitrite, and introducing an amide into the water stream that reduces the nitrite to nitrogen to provide a treated water stream having a reduced nitrate concentration.

The ZLD system includes a mix tank, an amide tank, and a crystallizer. The mix tank includes an inlet for receiving a water stream within the mix tank, and a container including a metal agent and is designed to allow the water stream to contact the metal agent. The amide tank includes an amide and is designed to direct the amide into the water stream, The crystallizer is designed to receive the water stream from the mix tank after the water stream has been treated with the metal agent and amide in the mix tank.

These methods and systems are useful in utility and industrial water treatment systems employing ZLD processing.

DETAILED DESCRIPTION OF EMBODIMENTS

The methods and systems described herein are useful for removing nitrates from a water stream in ZLD systems and process. As discussed above, ZLD systems aim to reuse all water possible, and dispose of the solids contained in waste streams, preferably disposing of the solids in the driest form possible. ZLD processes can be both financially and environmentally beneficial for a range of industrial and municipal organizations. Examples of industries where nitrate removal from water streams may be desirable include power plants, steel mills, and ammonia plants. The ZLD system may be part of the water effluent from, for example, the operation of boilers, cooling towers, evaporators, and produced water generators. The ZLD processes can be configured for removing targeted dissolved solids from a wastewater or cooling tower blowdown stream and returning treated water to the process (source).

As discussed above, exemplary technology used in the processing of waste streams in ZLD systems is thermal evaporation and involve the use of a brine concentrator (also known as an evaporator), a crystallizer, and a final concentrator apparatus, such as a filter press or centrifuge. ZLD processes can be used in conjunction with other technologies including, for example, reverse osmosis (RO) operations configured for concentrating a portion of a waste stream and returning a clean permeate before the ZLD operation. In such cases, a smaller volume (the RO reject stream) may be treated in the ZLD operation, thereby improving performance and reducing power consumption.

Before entering the ZLD system, the water stream may contain a certain amount of dissolved solids, for example, about 0.15% to about 10.0%, about 0.25% to about 5%, or about 0.50% to about 1% total dissolved solids. The water stream may enter the ZLD process via a brine feed tank. Then, the water stream may be directed to a brine concentrator, where the water stream is circulated and heated until enough water has been evaporated to concentrate the wastewater stream or brine up to an initial crystallization point to create a supersaturated slurry. Because the solution is supersaturated, crystallization of sparingly soluble compounds will begin. Inside the brine concentrator, a falling film evaporator may be used such that heat from the vapor compressor is applied to a vertically oriented heat exchanger to bring the circulating slurry to a boil.

A total dissolved solid (TDS) concentration of, for example, about 14% may be achieved in the brine concentrator, creating a supersaturated slurry. The TDS concentration may be controlled to be in a range of about 5% to about 20%, about 10% to about 18%, or about 12% to about 15%. An upper limit of TDS, is critical for avoiding scaling throughout the system and expensive down time. Also, this upper limit is typically chosen for heat balance purposes. As the TDS concentration rises, so does the boiling point, that is, the temperature at which the solution will evaporate. The higher the boiling point, the more heat input necessary. However, there is a limit as to how much heat input the system can accept, both from an availability and heat flux perspective. Therefore, the TDS should be maintained below the upper limit.

During start up, calcium sulfate (gypsum) can be added to the slurry in the brine concentrator to act as a seed upon which scaling/crystallization can occur and to prevent scaling on the brine concentrator's metallurgy and components. The seed can be added and maintained to a total suspended solids (TSS) concentration in a range of from about 1% to about 15%, about 2% to about 10%, or about 3 to 7% for maintaining proper nucleation sites for scaling to occur.

After initial evaporation/crystallization, the slurry may be directed from the brine concentrator to a crystallizer. Like the brine concentrator, the crystallizer can contain an external heat source, such as a vapor compressor or plant steam, which is used to further concentrate the slurry. Unlike the brine concentrator, the crystallizer does not contain a falling film evaporator. As the slurry is circulated, it may enter a Forced Circulating Heat Exchanger (FCHE), which is designed to raise the slurry temperature about 3-6° F. above the inlet temperature. After this additional heat is applied, the brine enters the crystallizer vapor body where flashing (evaporation) occurs, thereby supersaturating the slurry. The crystallizer further supersaturates the slurry, resulting in crystallization, which allows for the removal of dissolved solids. For example, the crystallizer may concentrate the slurry to have a concentration of TDS in a range of from about 15% to about 50%, about 20% to about 40%, about 25% to about 35%, or about 30%. The crystallizer may concentrate the slurry to have a concentration of total suspended solids (TSS) of about 5% to about 40%, about 10% to about 35%, about 15% to about 30%, or about 20%. The collected condensate(s) and permeate(s) from the brine concentrator and the crystallizer can then be collected and returned to the process for reuse, thereby eliminating the discharge of liquids.

Once the desired total dissolved solids and total suspended solids concentrations are obtained in the crystallizer, the slurry is sent to a final concentrator apparatus or dewatering unit, which may be a centrifuge or a pressurized filter press. The concentrated slurry enters the dewatering unit and the process of dewatering takes place. Solids are then directed to a haul-off bin, and the filtrate, that is, water that has passed through the separation equipment and has been separated from the solids, is sent back to the crystallizer to be reprocessed. The ZLD system may dewater the slurry and achieve a concentration of about 75% to about 98% total solids, about 85% to about 95% total solids, or about 80% to about 90% total solids, with a corresponding concentration of about 2% to about 25% moisture, about 5% to about 15% moisture, or about 10% to about 20% moisture.

The methods and systems disclosed herein remove nitrates from water streams in the ZLD processes, which eliminates their contribution to boiling point elevation and costly downtime and water haul-off costs.

The method includes contacting a water stream being treated in a ZLD system with a metal reagent and an amide to remove nitrates contained within the water stream. By contacting the water stream with a metal reagent and an amide, nitrate contained in the water stream is reduced in a multistep process to nitrogen gas.

The metal reagent may be any suitable metal reagent for reducing nitrate to nitrite. For example, the metal reagent may be zinc, iron, copper, cadmium, chromium, lead, tin, aluminum, nickel, manganese, magnesium, and alloys or mixtures thereof. The metal reagent may be in any suitable form, such as powder, rods, shots, fines, pebbles, impregnated membrane, resin media, and liquid. For example, the metal reagent may be a granular solid zinc shot. The zinc granules may be shaped like barbells being about 1/16 inches long and about 1/32 inches wide. Exemplary systems and methods disclosed herein may employ a resin media, such as, but not limited to, polystyrene sulfonate and zeolites impregnated with the metal reagent. In one aspect, the metal reagent is present in cartridges inside a mix tank.

The metal reagents can be present in an amount sufficient to reduce at least 40% of the nitrates ($NO_3^-$) in the water stream to nitrites ($NO_2^-$), and preferably 75% to 95% of the nitrates. For example, the metal reagent may be introduced to the water stream in an amount in a range of from about 10 wt. % to about 500 wt. %, about 50 wt. % to about 250 wt. %, about 75 wt. % to about 150 wt. %, or about 100 wt. % based on the weight of the nitrates that are added to the industrial water system, e.g., based on the weight (in kg/hr) of nitrates entering the system in the makeup water source(s).

The amide may be any amide suitable for reducing the nitrite to nitrogen gas. For example, suitable amides may include sulfamic acid, urea, ammonia, formamide, acetamide, sulfamide, carboxamide, phosphoramide, secondary amides derived from primary amines ($R'NH_2$), and tertiary amides derived from secondary amines ($R'R''NH$). The amide may be introduced into the water stream in the form of a liquid. The amide may be introduced into the water stream upstream of the mix tank (FIGS. 2 and 3A) or may be injected directly into the mix tank. The amide is introduced to the water stream in an amount sufficient to reduce nitrite to nitrogen. For example, the amide may be introduced into the water stream in an amount in the range of from about 20 wt. % to about 1,000 wt. %, about 100 wt. % to about 500 wt. %, about 150 wt. % to about 300 wt. %, or about 200 wt. % based on the weight of the nitrates entering the system.

In one exemplary embodiment, zinc may be used as the metal reagent and sulfamic acid may be used as the amide. Zinc and sulfamic acid may be introduced into the system in amounts such that a weight ratio of the nitrate entering the system to the zinc added to the system is 1:1, and a weight ratio of zinc to sulfamic acid is 0.5:1. For example, the metal reagent and amide may be added to the system in amounts such that a weight ratio of the nitrate to the metal reagent to the amide is 1:1:2.

The systems and methods disclosed herein are effective for removing a significant amount of the nitrates entering the system. For example, if a flow rate of the nitrates entering the system is about 40 lbs $NO_3^-$/hr, the systems and methods may remove about 30% to about 99% by weight, about 50% to about 95%, or about 60% to about 90% by weight of the nitrates. The amount of nitrates removed by the present methods and systems may be measured, for example, based on the amount of nitrogen gas released from the system or the boiling point of the water stream in the crystallizer.

Figure 2:
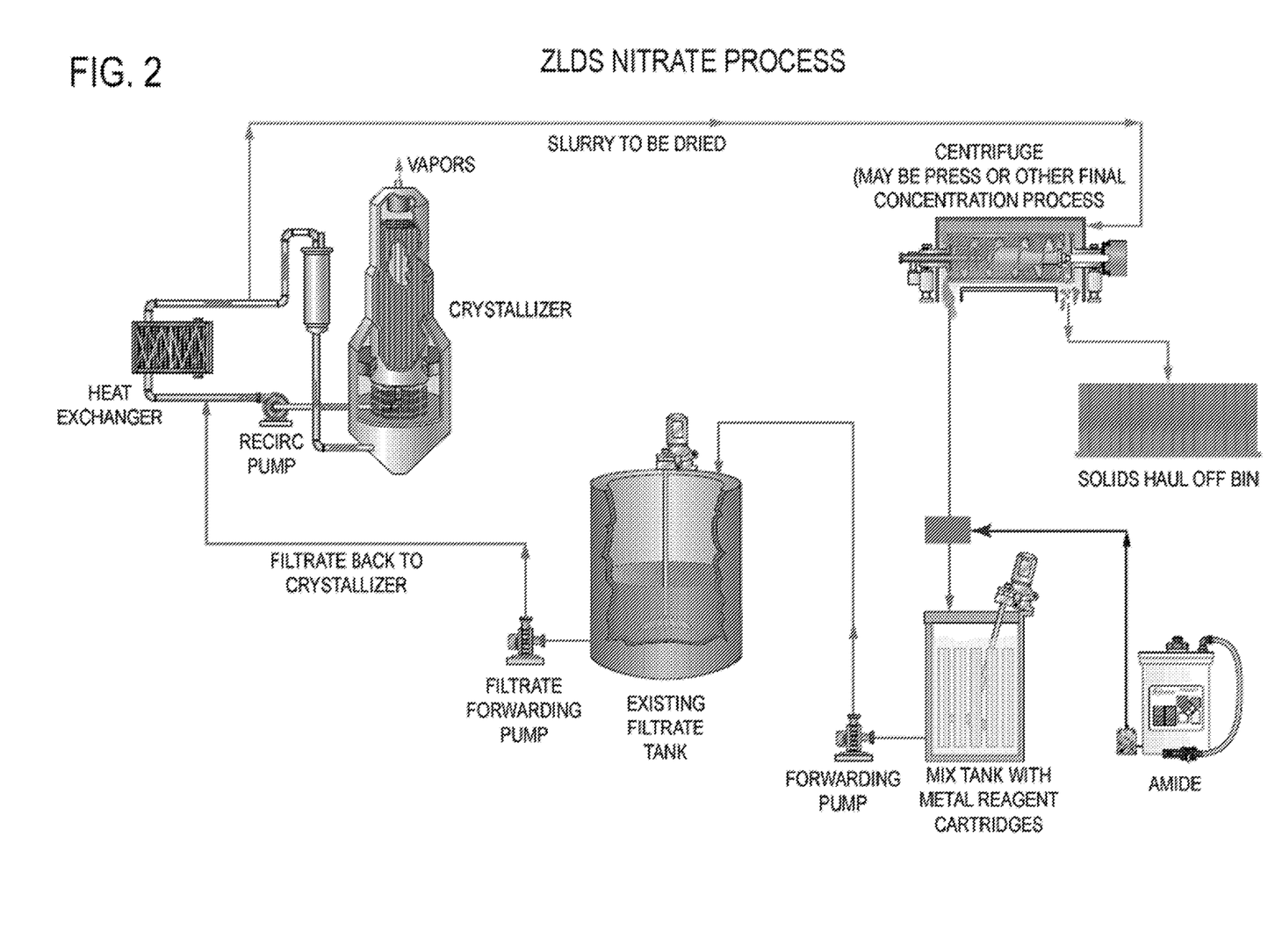
FIG. 2 is a schematic diagram of an embodiment of a ZLD system in which a mix tank is added to remove nitrates.

FIG. 2 illustrates one embodiment of the invention where the water stream or filtrate from a centrifuge in a ZLD system is directed to a mix tank for removal of nitrates prior to being directed to a filtrate tank and returned to the crystallizer. Although FIG. 2 shows collecting the filtrate from a centrifuge, the filtrate may alternatively be collected from a different final concentrator apparatus in a ZLD system, such as a filter press. In ZLD systems, the filtrate from a filter press or centrifuge is normally directed to a filtrate tank via, for example, a gravity drain. However, as illustrated in FIG. 2, the filtrate in the present methods and systems is instead diverted to a mix tank for processing to remove nitrates before being directed to the filtrate tank and crystallizer for further processing. FIG. 2 shows a similar ZLD system as that described above with respect to FIGS. 1A and 1B, except that the filtrate is directed to a mix tank for removal of nitrates before being returned to the crystallizer. Additionally, some elements of the ZLD system, such as the brine concentrator, are not illustrated in FIG. 2.

As shown in FIG. 2, the filtrate from the final concentrator apparatus or dewatering unit is introduced into to a mix tank. The amide is introduced into the water stream from an amide tank. As shown in FIG. 2, the amide is injected into the water stream upstream of the mix tank in the line running from the dewatering unit to the mix tank. The amide, when added in sufficient quantities, can serve a dual purpose of decreasing the pH of the water stream and catalyzing the reduction of nitrite to nitrogen gas. It has been discovered that a decrease in the pH of the water stream facilitates reduction of the nitrate contained therein to nitrite upon contact with the metal reagent in the mix tank. For example, the water stream may have a pH of about 6.5 to about 7.5. At that pH, the reduction of nitrate to nitrite by the metal reagent is inhibited. Therefore, by introducing sufficient amide into the water stream before the water stream is introduced into the mix tank, the amide can reduce the pH of the water stream to a level that promotes the reduction reaction of the nitrate to nitrite upon contact with the metal reagent in the mix tank. For example, the amide may be added to decrease the pH of the water stream to a pH of about 3 to about 6, about 3.5 to about 5.5, or about 4 to about 5 to promote nitrate reduction. Then, once the nitrate is reduced to nitrite by the metal reagent in the mix tank, the amide can catalyze the reduction of the nitrite to nitrogen gas. For this reason, the amide can be added to the water stream upstream from the location of the metal agent, which allows the pH of the stream to be reduced before it is contacted with the metal reagent.

In the embodiment shown in FIG. 2, the mix tank is a closed system, containing cartridges containing the metal reagent, and a mixer. The cartridges may be removable. Once the water stream is introduced into the mix tank, the metal reagent contacts the water stream and reduces the nitrate to nitrite. The mix tank includes a mixing impeller with a motor for stirring the water in the mix tank. Any suitable mixing means, such as fluid bed, trickle bed, or fixed bed processing, may be employed in the methods and systems disclosed herein for achieving effective contact of the reagents. After reducing the nitrate to nitrogen gas, the water stream is directed to a filtrate tank, where it may be pumped, for example, via a filtrate forwarding pump, to a crystallizer for further processing. The filtrate tank may contain vents for venting the nitrogen gas produced by the multistep reduction of nitrate.

As discussed above, the crystallizer processes the water stream to concentrate solutes in the solution to produce a supersaturated slurry. Once desired TDS and TSS concentrations are obtained in the crystallizer, the slurry can be sent to the dewatering unit, which may be a centrifuge or a pressurized filter press, where the process of dewatering takes place. Solids are then sent to a haul-off bin, and the filtrate (water that has passed through the separation equipment and has been separated from the solids) may be sent to the mix tank for nitrate removal before being sent back to the crystallizer to be reprocessed.

Advantageously, any metal reagent or amide in the water stream will be reacted with or precipitated in the process. For example, any metal reagent and/or amide remaining in the water stream after processing in the mix tank will be directed to the crystallizer for further processing, during which the metal reagent and/or amide will precipitate and be disposed of along with the produced solids. This eliminates the need for electrochemically treating the water stream to recover any unreacted metal in the water stream.

Figures 3A, 3B:
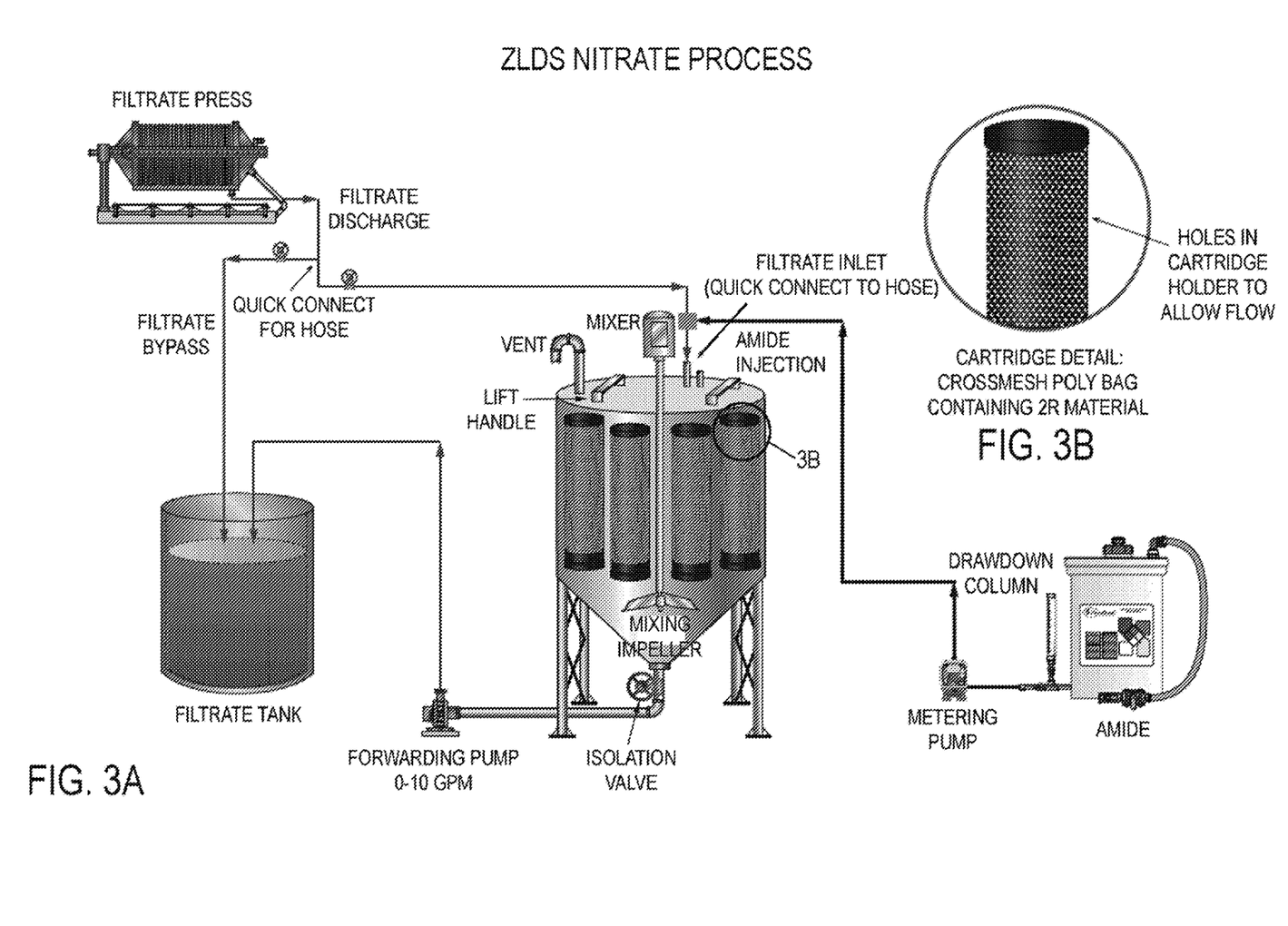
FIG. 3A is a schematic diagram of an embodiment of a mix tank for removing nitrates in a ZLD system.
FIG. 3B illustrates a cartridge holder for containing the metal reagent.

FIG. 3A shows an embodiment of a mix tank for nitrate removal in a ZLD system. In FIG. 3A, the water stream is a filtrate obtained from a filtrate press as the dewatering unit. As in the embodiment shown in FIG. 2, the water stream is directed to a mix tank before being sent a filtrate tank and then a crystallizer (not shown in FIG. 3A) for further processing. The system illustrated in FIG. 3A also has a bypass pipe, which allows the water stream to bypass the mix tank and go directly to the filtrate tank, for example, if nitrate removal is not desired. Otherwise, the water stream is introduced into the mix tank via a water stream inlet. The water stream may be directed from the dewatering unit, such as a filtrate press or centrifuge, to the mix tank via any suitable means. For example, the water stream may be directed to the mix tank via a gravity feed or a pump. The amide is injected into the water stream upstream of the mix tank in the line running from the filtrate press to the mix tank.

Figure 4:
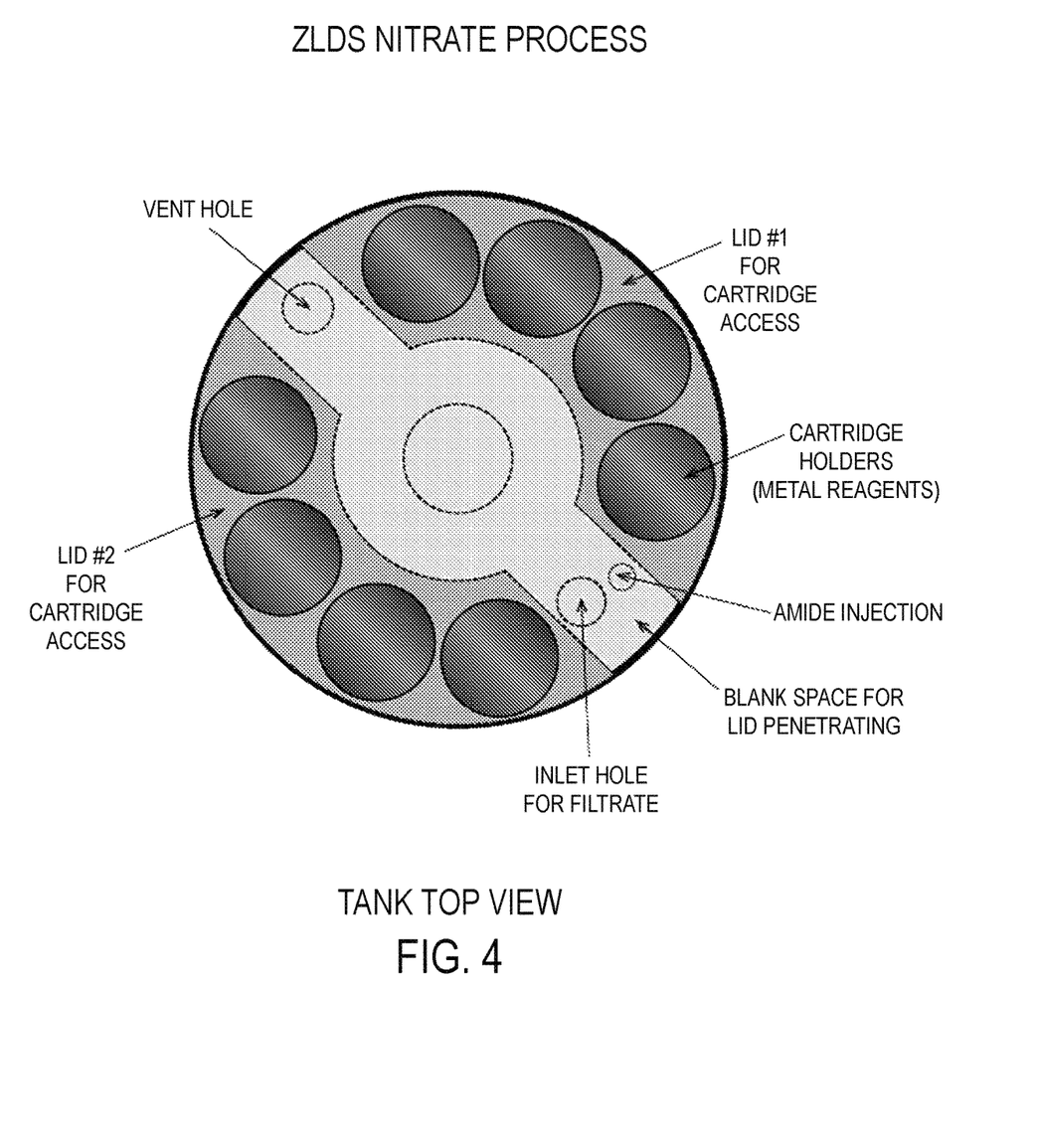
FIG. 4 illustrates a top view of an embodiment of a mix tank for removing nitrates.

The mix tank illustrated in FIG. 3A is a cone bottomed tank and includes a top, which includes a water stream inlet through which the water stream is introduced into the mix tank, and a vent for venting the nitrogen gas or any other gases. The mix tank may have any suitable shape. For example, the mix tank may be entirely cylindrical (FIG. 2), or may have a cylindrical top portion with a conical bottom (FIG. 3A) or frusto-conical bottom. The top of the mix tank contains lift handles for removing the top of the mix tank. This allows easy access to the cartridges for cartridge removal. FIG. 4 shows a top view of the mix tank. As shown in FIG. 4, the mix tank top includes, for example, two lids for cartridge access, an inlet for receiving the water stream, and a vent for venting the nitrogen gas produced by the reduction reaction and/or any other gases. The top in FIG. 4 also include an amide injection port for injecting the amide into the mix tank to introduce the amide into the water stream. Alternatively, as shown in FIGS. 2 and 3A, the amide may be introduced into the water stream upstream from the mix tank. For example, the amide may be introduced into the water stream in the line between the dewatering unit and the mix tank.

As in the embodiment shown in FIG. 2, the mix tank illustrated in FIG. 3A contains cartridges, which may be removable and which contain the metal reagent. As shown in FIG. 3B, the cartridges contain holes for allowing flow of the water stream through the cartridges to contact the metal reagent. The mix tank also includes a mixing unit, such as a mixer, including a mixing impeller for stirring the water stream such that the water stream flows through the cartridges to contact the metal reagent, as well as for mixing the water stream and the amide. The mixing unit may be any suitable device for mixing the water stream in the mix tank. For example, the mixing unit may be a handheld mixer or a built-in impeller. Although the amide is preferably injected into the water stream upstream of the mix tank, the mix tank may also include an amide injection port formed on the mix tank top for injecting the amide into the mix tank to contact the water stream. The system includes an amide tank from which the amide may be metered via a metering pump or any other suitable conduit or valve for delivering the amide from the amide tank to the water stream. The system also includes a prefilter, such as a downward column, to remove any suspended solids from the amide prior to injection into the mix tank. The system may also include a pressure measurement system for measuring the delta pressure across the prefilter.

As shown in FIG. 3A, once the water stream has been sufficiently mixed to contact the metal reagent and the amide to reduce the nitrate in the water stream to nitrite and then to nitrogen gas, the water stream is removed from the mix tank via a valve or any other suitable conduit. The valve in FIG. 3 is formed in the cone-shaped bottom of the mix tank, but may be formed in any suitable location in the mix tank for removing the water stream from the mix tank. After the water stream is removed from the mix tank, the water stream may be directed to a filtrate tank via a forwarding pump or any other suitable device for delivering the water stream from the mix tank to the filtrate tank. The filtrate tank may contain vents for venting the nitrogen gas. Then, the water stream may be directed to a crystallizer for further processing. Alternatively, the water stream may be directly sent to the crystallizer from the mix tank without first being delivered to a filtrate tank.

In the methods and systems disclosed herein, the water stream may be contacted with the metal reagent and the amide sequentially or simultaneously. For example, the amide may be introduced into the water stream before the water stream is introduced into the mix tank to first decrease the pH of the water stream to promote the reduction reaction to take place. For example, as shown in FIGS. 2 and 3A, the amide may be introduced into the water stream in the line running from the dewatering unit to the mix tank. Then, the water stream may be introduced into the mix tank via an inlet formed in the top of the mix tank or any other suitable location. Once in the mix tank, the water stream may then contact the metal reagent contained within cartridges in the mix tank to allow the nitrate contacted in the water stream to be reduced to nitrite. Then, the amide already contained in the water stream will catalyze the reduction of nitrite to nitrogen gas. Alternatively, the amide may be introduced into the mix tank simultaneously with the water stream to reduce the pH of the water stream, allow the metal reagent to reduce the nitrate to nitrite, and then catalyze the reduction of the nitrite to nitrogen gas. Inside the mix tank, the water stream and amide may be mixed together to allow the nitrate to contact the metal reagent contained within the cartridge such that the nitrate is reduced to nitrite by the metal reagent and then the nitrite is reduced to nitrogen gas by the amide. The mix tank is preferably a closed system. Therefore, the nitrogen gas may be vented out of the filtrate tank. Alternatively, the mix tank may include a vent for venting the nitrogen gas produced by the multistep reduction reaction.

The water stream being treated for nitrate removal according to the present methods and systems may be any water stream in a ZLD system and/or process. For example, the water stream directed to the mix tank for nitrogen removal may be an ultra or micro filtration effluent, a clarifier effluent, a brine concentrator feed, a brine concentrator slurry, brine concentrator blowdown, a crystallizer feed, a crystallizer slurry, a crystallizer blowdown, a filter press feed, a filter press filtrate, a centrifuge feed, a centrifuge filtrate, a rotary drum dryer feed, a water stream obtained from an evaporation or storage pond, or a water stream obtained from one or more process storage tanks. In one aspect, the water stream may be a reverse osmosis reject stream prior to processing via the ZLD process, for example, before the stream is directed to the brine concentrator. In another aspect, the water stream may be, for example, the makeup source stream prior to being used in the facility, or a wastewater stream, such as a cooling tower blowdown, prior to be treated via the ZLD process, for example, before the wastewater stream is directed to the brine concentrator. While these water streams would be easier to treat from a suspended solids and ionic loading perspective, the volumes would be much greater. An economical evaluation may be performed to determine the best location for the proposed invention in a particular ZLD system.

Counterintuitively, introducing dissolved solids, such as the amide, into the water stream in a ZLD system, which is designed to remove dissolved solids, improves the system's overall ZLD processing capacity, and reduces the system's operational expenditures and environmental impact by removing nitrates from the water stream.

As discussed above, the accumulation of nitrates and the increase in TDS increases the boiling point elevation of the crystallizer, which in turn increases the heat input demand. For example, the boiling point may increase about 15% to about 50%, about 20% to about 40%, or about 30% to about 35%. For example, the boiling point may be increased to about 220° F. or more, about 220° F. to about 400° F., about 230° F. to about 350° F., or about 245° F. to about 300° F. However, because plants operating thermal systems do not have an infinite supply of heat and the crystallizer cannot handle an infinite amount of heat input, at some point, the amount of heat necessary to induce evaporation exceeds the amount of heat available or the design limitations of prior art systems. As a result, prior art plants would have to either shut down or dispose of the slurry, both of which are very expensive.

The methods and systems disclosed herein provide a means for eliminating this issue, which has plagued ZLD plants for decades by removing nitrates from the water stream. Other technologies are available for the removal of nitrates from waste streams, but all have serious disadvantages. As a result of the methods and systems disclosed herein, crystallizer capacity and run time are increased, total ZLD throughput and run time are increased, energy used to achieve evaporation is decreased, overall ZLD energy consumption is decreased, costly water haul-offs are eliminated, ZLD water recovery rates are improved, and the man-hours needed during boil-out processes to remove nitrate laden waste water are reduced.

What is claimed is:

1. A method for treating a water stream that contains a nitrate, the method comprising:
    contacting the water stream with a metal agent that is effective to reduce the nitrate contained therein to a nitrite;
    introducing an amide into the water stream that reduces the nitrite to nitrogen to provide a treated water stream; and
    subjecting the treated water stream to an evaporative crystallization treatment,
    wherein the contacting and introducing steps are effective to decrease the nitrate concentration in the water stream so as to prevent accumulation of the nitrate in the water stream.

2. The method according to claim 1, wherein the water stream is a filtrate obtained by dewatering a slurry.

3. The method according to claim 1, wherein the metal agent is at least one selected from the group consisting of zinc, iron, copper, cadmium, chromium, lead, tin, aluminum, nickel, manganese, magnesium, and alloys and mixtures thereof.

4. The method according to claim 1, wherein the amide is at least one selected from the group consisting of sulfamic acid, urea, ammonia, formamide, acetamide, sulfamide, carboxamide, phosphoramide, a secondary amide derived from a primary amine (R'NH$_2$), and a tertiary amide derived from a secondary amine (R'R"NH).

5. The method according to claim 1, wherein the metal agent is in the form of a powder, rods, shots, fines, pebbles, impregnated membrane, resin media, or liquid.

6. The method according to claim 1, wherein the amide is introduced into the water stream in the form of a liquid.

7. The method according to claim 1, wherein the amide is introduced into the water stream before the water stream is contacted with the metal agent.

8. The method according to claim 1, wherein the metal agent is zinc.

9. The method according to claim 1, wherein the amide is sulfamic acid.

10. The method according to claim 1, wherein the metal agent is zinc and the amide is sulfamic acid.

11. The method of claim 1, wherein the contacting and introducing steps are effective to remove from 30% to 99% by weight of the nitrate in the water stream.

12. The method of claim 1, wherein the contacting and introducing steps are effective to remove from 50% to 95% by weight of the nitrate in the water stream.

13. A zero liquid discharge (ZLD) system comprising:
    a mix tank comprising
        an inlet for receiving a water stream within the mix tank, the water stream containing a nitrate; and a container comprising a metal agent that is configured to allow the water stream to contact the metal agent and reduce the nitrate in the water stream to a nitrite:
an amide tank comprising an amide that is configured to direct the amide into the water stream and reduce the nitrite in the water stream to nitrogen; and
an evaporative crystallizer configured to receive the water stream from the mix tank,
wherein the system is configured so that the metal agent and amide respectively contacting directed into the water stream are effective to decrease the concentration of the nitrate in the water stream and prevent accumulation of the nitrate in the water stream.

14. The ZLD system according to claim 13, wherein the mix tank further comprises a mixing unit configured to mix the water stream in the mixing tank.

15. The ZLD system according to claim 13, wherein the crystallizer is configured to crystallize the water stream.

16. The ZLD system according to 15, further comprising a dewatering unit configured to dewater the crystallized water stream to separate solid material from the water stream.

17. The ZLD system according to claim 16, wherein the mix tank is configured to receive the water stream from the dewatering unit.

18. The ZLD system according to claim 16, wherein the amide tank is configured to direct the amide into the water stream in a line between the dewatering unit and the mix tank.

19. The zero liquid discharge system of claim 13, wherein the system is configured so that the metal agent and the amide respectively contacting directed into the water stream are effective to remove from 30% to 99% by weight of the nitrate in the water stream.

20. A zero liquid discharge (ZLD) system comprising:
a mix tank comprising
an inlet for receiving a water stream within the mix tank; and
a container comprising a metal agent that is configured to allow the water stream to contact the metal agent;
an amide tank comprising an amide, which is added to the water stream;
an evaporative crystallizer configured to receive the water stream from the mix tank and to crystallize the water stream; and
a dewatering unit configured to dewater the crystallized water stream to separate solid material from the water stream,
wherein the mix tank is configured to receive the water stream from the dewatering unit.

* * * * *